No. 36,309.
PATENTED AUG. 26, 1862.
A. SCHWEIZER & G. JANSEN
SCRUBBING BRUSH.
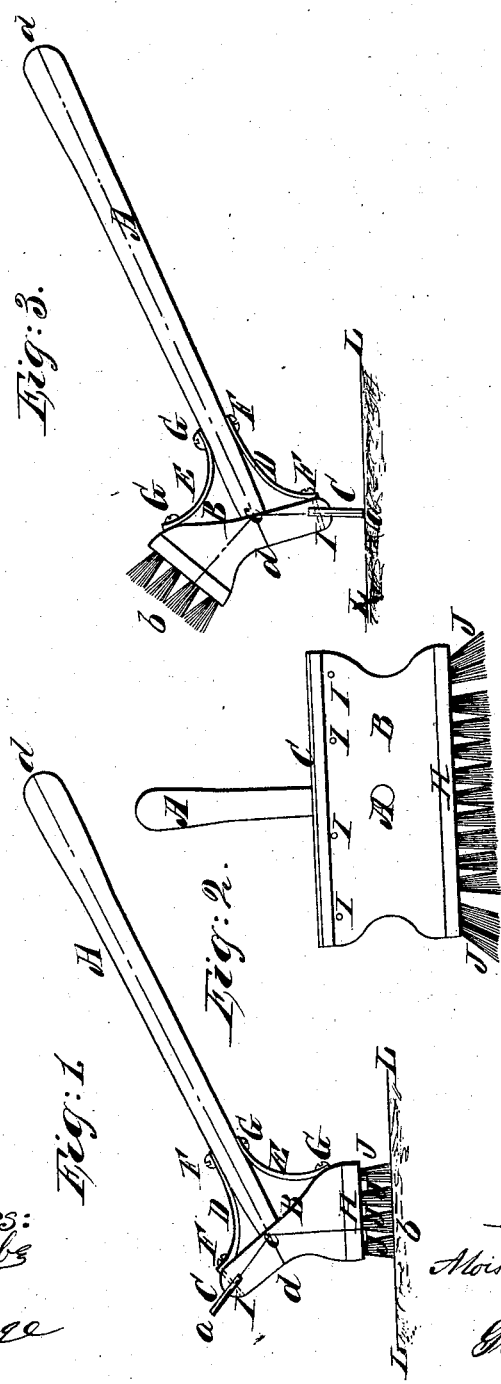

UNITED STATES PATENT OFFICE.

ALOIS SCHWEIZER AND GEORGE JANSEN, OF CLEVELAND, OHIO.

IMPROVED SCRUBBING-BRUSH.

Specification forming part of Letters Patent No. 36,309, dated August 26, 1862.

*To all whom it may concern:*

Be it known that we, ALOIS SCHWEIZER and GEORGE JANSEN, of Cleveland, in the county of Cuyahoga and State of Ohio, have invented certain new and useful Improvements in Scrubbing-Brushes; and we do hereby declare that the following is a full, clear, and exact description of the construction and operation of the same, reference being had to the accompanying drawings, in which—

Figure 1 represents a side view of said brush when it is used for scrubbing. Fig. 2 represents a front view of said brush. Fig. 3 represents a side view of the same when it is used for wiping or drying the floor.

The nature of our invention consists in combining with a scrubbing-brush an elastic rubber at such an angle to the brush that either of the two may assume a perpendicular position on the floor when the handle of the implement is turned around its axis while said handle is held in the position most convenient for performing the operation of scrubbing.

To enable others skilled in the art to make and use our invention, we will proceed to describe its construction and operation.

A represents the handle of the implement; B, the block to which the brush and rubber are secured.

The brushes J are secured to the head H, the latter being fastened to the block B by means of screws. The brush may thus be detached from the block when worn down and be replaced at pleasure by a new one. The rubber C is inserted in the upper edge, I, of the angular block B and secured therein by screws or otherwise, and the relative position of said rubber to the brush, as indicated by the red lines $a\,c$, $c\,b$, and $d\,d$, is such that the angle $a\,c\,d$ is equal to the angle $d\,c\,b$; that consequently when the handle is held in the position represented in Fig. 1, where the brush stands perpendicular and the entire face of the brush rests on the floor, said handle, on being turned on its axis $d\,d$ to the position represented in Fig. 3, the rubber C will assume a perpendicular position, the handle being constantly in the position most convenient for performing the work. The object of this combination is that when the brush has been used for scrubbing the floor the implement may be turned to the position represented in Fig. 3, and by operating the rubber on the floor the suds are moved forward and away from the part scrubbed, and the floor is effectually cleansed, wiped, and dries readily.

The rubber may be secured in the block B by means of screws passing through slots in said rubber, so that the latter may be adjusted and moved outward when partially worn down.

Having thus fully described the nature of our invention, what we claim herein as new, and desire to secure by Letters Patent, is—

As a new article of manufacture, a combined floor scrubber and wiper when the several parts are constructed and arranged substantially in the manner and for the purposes herein described.

ALOIS SCHWEIZER.
    GEORGE JANSEN.

Witnesses:
 JOHN G. FAY, Jr.,
 HENRY SCHNEIDER.